United States Patent
Simeon

(10) Patent No.: US 6,233,276 B1
(45) Date of Patent: May 15, 2001

(54) XDSL MODEM HAVING TIME DOMAIN FILTER FOR ISI MITIGATION

(75) Inventor: Richard Simeon, Raleigh, NC (US)

(73) Assignee: Virata Corporation, Cambridge (GB)

( * ) Notice: Subject to any disclaimer, the term of this patent is extended or adjusted under 35 U.S.C. 154(b) by 0 days.

(21) Appl. No.: 09/394,091

(22) Filed: Sep. 13, 1999

(51) Int. Cl.$^7$ .................................................. H03H 7/30
(52) U.S. Cl. ........................... 375/232; 333/28 R; 333/18
(58) Field of Search .................................. 375/232, 229, 375/233, 234; 333/1, 18, 28 R

(56) References Cited

U.S. PATENT DOCUMENTS

| | | |
|---|---|---|
| 4,696,043 | 9/1987 | Iwahara et al. ........................ 381/92 |
| 5,230,007 | 7/1993 | Baum ................................. 375/232 |
| 5,268,930 | 12/1993 | Sendyk et al. ....................... 375/233 |
| 5,285,474 | 2/1994 | Chow et al. . |
| 5,383,164 | 1/1995 | Sejnowski et al. .................. 367/134 |
| 5,461,640 | 10/1995 | Gatherer . |
| 5,479,447 | 12/1995 | Chow et al. . |
| 5,625,651 | 4/1997 | Cioffi . |
| 5,748,686 | 5/1998 | Langberg et al. . |
| 5,774,505 | 6/1998 | Baugh . |
| 5,870,432 | 2/1999 | Kerckhove . |
| 5,901,180 | 5/1999 | Aslanis et al. . |
| 5,987,005 | 11/1999 | Fertner et al. . |
| 6,031,868 | 2/2000 | Robertson et al. . |
| 6,031,882 | 2/2000 | Enge et al. . |
| 6,034,000 | 3/2000 | Bingham . |
| 6,047,025 | 4/2000 | Johnson et al. . |
| 6,130,918 | 10/2000 | Humphrey et al. . |

OTHER PUBLICATIONS

Thierry Pollet and Miguel Peeters, Alcatel "Synchronization with DMT Modulation" p. 80–86; IEEE Commications Magazine (Apr. 1999).

Primary Examiner—Chi H. Pham
Assistant Examiner—Kevin M Burd
(74) Attorney, Agent, or Firm—Pennie & Edmonds LLP

(57) ABSTRACT

An xDSL communication system having a reduced number of digital filter coefficients. The full-length equalizer channel impulse response is truncated by first selecting a subset of contiguous filter samples followed by windowing and convolution with a time domain representation of a frequency domain filter. The result is a shorter equalizer having fewer coefficients so as to improve data transmission rate.

11 Claims, 8 Drawing Sheets

W[n]

E[m]

Z[m] = T[m]·E[m]

Q[j] = Z[m]⊛F[l]

S[m]

T[m]

F[k]

XDSL MODEM HAVING TIME DOMAIN FILTER FOR ISI MITIGATION

RELATED APPLICATIONS

NONE

TECHNICAL FIELD

The present invention is generally related to the field of digital communications across a transmission line. It is particularly suited to xDSL communications systems in which a time domain filter and/or a frequency domain equalizer is used to compensate for the channel corruption experienced by a transmitted signal.

BACKGROUND OF THE INVENTION

A communication channel linking a first transceiver to a second transceiver carries signals between the two. Regardless of which device transmits and which device receives, the channel typically corrupts a transmitted signal by altering the latter's amplitude and phase characteristics at frequencies across the channel's spectrum. As a result, the receiver receives a noisy version of the transmitted signal. If the nature of the corruption varies with time, the channel is considered to be a time-varying channel. If, on the other hand, the nature of the corruption does not change with time, or changes very slowly relative to the duration of a transmission, the channel is considered to be a time-invariant channel. For time-invariant channels, the corruption experienced by a transmitted signal can be predicted by estimating the channel's impulse response (CIR), which is a representation of the extent of spreading experienced by an impulse transmitted over that channel. One may estimate a time-invariant channel's CIR by transmitting a plurality of known training signals at known times, receiving the channel-corrupted training signals, and then calculating the CIR by techniques such as Least Mean Squares (LMS), among others. Once the CIR of a channel has been calculated, one may develop a channel equalizer to compensate for the corruption experienced by a transmitted signal.

FIG. 1 presents a block diagram of a typical Digital Subscriber Line (xDSL) modem, for HDSL, ADSL, SDSL, VDSL and similar communication. xDSL modems represent the next generation of high-speed digital communications for the Small-Office/Home-Office (SOHO) environment, as well as the burgeoning home user market which has been spurred on by the Internet. As seen in the diagram of FIG. 1, a typical xDSL modem 100 comprises a communication controller 102 to interface with a local network, computer or other equipment, a transceiver 04 and a line driver 106 which interfaces with a twisted-pair transmission line. It should be understood that xDSL modems may have other components and connections as well, and that the blocks shown may not always be present in a single unit.

FIG. 2a shows a block diagram of the modem's transceiver 104. The transceiver 104 includes an analog front end 114, a signal processor 112 and a digital interface 110. The analog front end 114 typically includes a D.C. isolating transformer, filters and amplifiers to connect to the line driver 106, and ADCs and DACs to interface the signal to and from the line driver to the signal processor 112. The digital interface 110 includes circuitry to interface the processed signal output from the signal processor 112 to the communication controller 102.

The signal processor 112 handles a number of functions. These functions may include such things as modulating and demodulating signals, echo cancellation, clipping mitigation, and filtering, among others. Thus, the signal processor 112 is used to convert the transmitted and received digital signals from one form to another. The signal processor 112 is typically implemented through a combination of hardware and executable software code. In the usual case, the signal processor includes a programmable computer, perhaps implemented as a reduced instruction set (RISC) computer, which handles only a handful of specific tasks. The computer is typically provided with at least one computer readable medium, such as a PROM, flash, or other non-volatile memory to store firmware and executable software code, and will usually also have an associated RAM or other volatile memory to provide workspace for data and additional software.

In the typical xDSL communication system, the signals handled by the signal processor 112 are discrete multitone signals (DMTs) comprising N/2 discrete tones simultaneously carried over the twisted pair. The collection of discrete tones is commonly referred to as a symbol, and a sequence of such symbols, spaced apart in time by a sacrificial prefix, are transmitted in xDSL communications. However, signal corruption by the twisted-pair may cause samples comprising one symbol to overlap with samples comprising adjacent symbols despite the presence of the sacrificial prefix. This phenomenon is called inter-symbol interference (ISI). In addition to ISI, another effect of channel corruption is that different DMT tones are attenuated and delayed to different degrees by the twisted pair channel and so may be unwieldy to process later on.

FIG. 2b illustrates some of the functions served by the signal processor 112 when receiving an xDSL signal during normal operation. Once the incoming DMT signal has been sampled by an analog-to-digital converter, the sampled signal is passed through a time domain filter 112a (TDF) to help mitigate ISI. The filtered sampled signal is then buffered in a serial-to-parallel converter 112b where the prefix is stripped and the DMT symbol is formatted and subjected to an N-length DFT, normally implemented as an FFT 112c, to convert the signal into N/2 complex discrete frequency coefficients. The complex signal is then subjected to a frequency domain equalizer 112d (FEQ) which accounts for the uneven attenuation and phase delay of the DMT symbol across the various frequencies. After passing through the FEQ 112d, the individual frequency bins may then be subject to decoding to extract the quadrature amplitude modulation (QAM) encoded signals. A more detailed description of xDSL communication, xDSL transceivers and equalizers can be found in U.S. Pat. No. 5,285,474 and U.S. Pat. No. 5,479,447, both to Chow et al., whose contents are incorporated by reference to the extent necessary to understand the present invention.

Before normal operations can begin, however, one must first establish the tap coefficients for the TDF 112a and correction factors for the FEQ 112d. The TDF is normally implemented in executable software code and stored as tap coefficients in a memory associated with the signal processor 112. The same holds for the correction factors of the FEQ. Typically, both of these are established at the time a communication link is set up between an xDSL modem and another communications device via a twisted pair. When a communication link for a static channel is first established, the channel distortion characteristics are determined by transmitting known training signals over the twisted pair, receiving the channel-corrupted signals at the receiver, and employing LMS or some other algorithmic technique to estimate the impulse response of the channel. From these, one may then calculate the taps of the TDF 112a and the correction factors of the FEQ 112d. Ideally, the TDF and FEQ will not only remove ISI, but also account for any attenuation and phase distortion caused by the channel, across all frequencies.

In addition to simply calculating the various tap coefficients and correction factors during training, one must also determine the DMT symbol boundaries. DMT demodulation is predicated on the independence of DMT symbols. The DMT symbols must be independent because the DFT performs circular, rather than linear, convolution. Consequently, receivers must be designed to encapsulate a single and complete DMT symbol for DFT processing. This requires the receivers to be in synchronization with the transmitter's symbol boundary. A more detailed description of synchronization of receivers to transmitters for DMT modulation in xDSL communication can be found in U.S. Pat. No. 5,901,180 to Aslanis et al, and also in T. Pollet et al, "Synchronization With DMT Modulation", IEEE Communications Magazine, April 1999, p. 80–86.

Once created, due to the static nature of the channel's impulse response, the TDF and the FEQ can be used until that particular communication link is terminated. The prior art teaches various techniques to form the time domain filter and a fully-trained frequency domain equalizer. U.S. Pat. No. 5,461,640 and U.S. Pat. No. 5,870,432, whose contents are incorporated by reference to the extent necessary to understand the present invention, exemplify such prior art techniques.

An FEQ for a DMT signal employing, say, N/2=128 discrete frequencies, needs N/2=128 complex coefficients to model the channel and account for the attenuation and phase distortion at each of the discrete frequencies. The length of the TDF 112a, on the other hand, is not based on the number of frequency bins in the DMT symbol. If one were to first create a N-length frequency domain vector comprising the N/2-length FEQ and its conjugates to account for both positive and negative frequencies, and then take its inverse discrete fourier transform (implemented as an IFFT), one would have a TDF which is full-length time-domain "equalizer" filter having N=256 real tap weights. Without loss of generality, it can be shown that TDFs of long length (e.g. those that operate on large number of samples) perform better than those of short length. Thus, a full-length TDF which mitigates the effects of a channel represents the optimal solution to reversing the effects of frequency-dependent amplitude and phase distortion on a received signal, and is achieved when the channel impulse response is reduced to a single impulse upon application of the full-length TDF. Thus, the mitigation is realized through the use of a time-domain linear transversal filter applied to the incoming signal. Generally, the number of modeled poles and zeros present in the channel dictates the required number of taps needed for minimal ripple in the passband of the TDF.

For high-speed digital communications such as xDSL, the useful passband are typically large and thus requires many taps to fully mitigate the effects of the channel. However, the environment of high-speed communications implies that sampled data needs to be processed in a timely fashion. This, in turn, may discourage or prohibit complete mitigation of channel effects if the number of taps in the TDF is large, since the filter must be run every time a sample is introduced in the receiver. In this case, inter-symbol interference (ISI) cannot be eliminated, and as a result symbols must be spaced farther apart in time to account for the "tail" or "bleed-over" of the adjacent symbol.

Additionally, the complexity and computational load of a TDF, which is normally implemented in executable software code resident in a computer readable memory associated with a processor, can become very expensive when one is trying to mitigate ISI in a twisted-pair channel exhibiting a high "eigenvalue spread". And since the TDF must be applied on all incoming samples, the entire process can be time-consuming, ultimately reducing data throughput.

Rather than employ an optimal, or full-length, TDF, one may use a reduced-length TDF having fewer tap coefficients than the full-length TDF. Such a "shortening" TDF, is modeled on a shortened channel impulse response having fewer taps than the original channel impulse response and thus reduces the computational burden. And because of the shortened response, one may transmit symbols closer together, thus increasing the data transmission rate. In fact, current ADSL transmission specifications include a symbol guard-band time implemented via a cyclic prefix. The symbol guard-band spaces the DMT symbols far enough apart for a shortening TDF to reduce the impulse response to less than the cyclic prefix length. This allows for symbol independence, while eliminating the need for a computationally expensive full-length TDF.

One technique for shortening the impulse response is described in J. Chow et al., "A Cost Effective maximum Likelihood Receiver For Multicarrier Systems", Proc. IEE ICC '92 p948–952, Chicago, June 1992. This approach employs the auto-correlation matrix and the cross-correlation matrix of the received signal. The auto-correlation matrix is inverted, multiplied by the cross-correlation matrix, and stored. This result is calculated NM times, N being the length of the time-domain filter to find the best coefficients for shortening the impulse response, and M being a user-defined number of times that the cross-correlation matrix is adjusted to find the best phase offset.

Another technique for shortening the impulse response is described in Falconer & Magee, "Adaptive Channel Memory Truncation for Maximum Likelihood Sequence Estimation", The Bell System Technical Journal, v. 52, No. 9, November 1973. In this technique, the coefficients are formed through a "brute-force" approach. The ratio of energy inside a window of N samples, as compared to the energy outside the window, is maximized subject to certain energy constraints by means of a least-square-error reduction technique. Formation of the energy components involves Cholesky decomposition, matrix inversion, and eigenvalue analysis of Nth-order matrices. Matrix inversion cost is alleviated through the use of the Levinson-Durbin algorithm, which is commonly used to invert Toeplitz matrices, such as the auto-correlation matrices of real-valued samples.

Another technique based on modeling the channel as an auto-regressive (AR) model is described in P. Melsa et al., "Impulse Response Shortening for Discrete Multitone Transceivers", IEEE Trans. On Communications, Vol. 44, No. Dec. 12, 1996. Based on a process length of N taps, the algorithm computes the Nth order AR model using an iterative technique based on a multichannel version of the Levinson algorithm. The computed poles are then used in an all-zero filter to cancel the modeled poles, thus leaving only the finite number of zeros as the CIR.

Finally, aforementioned U.S. Pat. No. 5,285,474 presents an approach to shortening an impulse response in which a target channel is formed through reception of a known training sequence and updated by using an LMS algorithm or complex-valued division. The equalizer uses a truncated target channel along with the received signal and a local copy of the training sequence to update its taps accordingly, also using the LMS algorithm or complex-valued division.

SUMMARY OF THE INVENTION

The present invention is directed to a method for creating a time domain filter in an xDSL modem. In the method of the present invention, a full-length frequency domain equalizer is first calculated and used to create a full-length TDF having N time domain taps. A subset M, M<N, of contiguous tap weights are then selected using a predetermined criterion. These M weights are then multiplied by a non-rectangular smoothing window to mitigate the effects of having effectively been windowed by a boxcar in the selection process. Finally, the smoothed weights are filtered in the frequency domain.

The present invention is also directed to an xDSL modem having a shortened TDF. The apparatus of the present invention includes computer means for calculating a full equalizer having N taps, selection means for selecting a subset of M contiguous taps from among the N taps using a predetermined criterion, multiplication means for windowing the M selected taps using a smoothing window, and filtering means for filtering the windowed M selected taps.

BRIEF DESCRIPTION OF THE DRAWINGS

The present invention can better be understood through the attached figures in which.

DETAILED DESCRIPTION OF THE INVENTION

Upon establishing a communications link over a channel, the transceiver's receiver begins to train its frequency domain equalizer to compensate for amplitude and phase distortion in the communications channel comprising a twisted pair. Through "force training", the equalizer uses a reference pattern containing the training sequence to force the taps to alter the received signal so that it matches the reference pattern.

Figure 1:
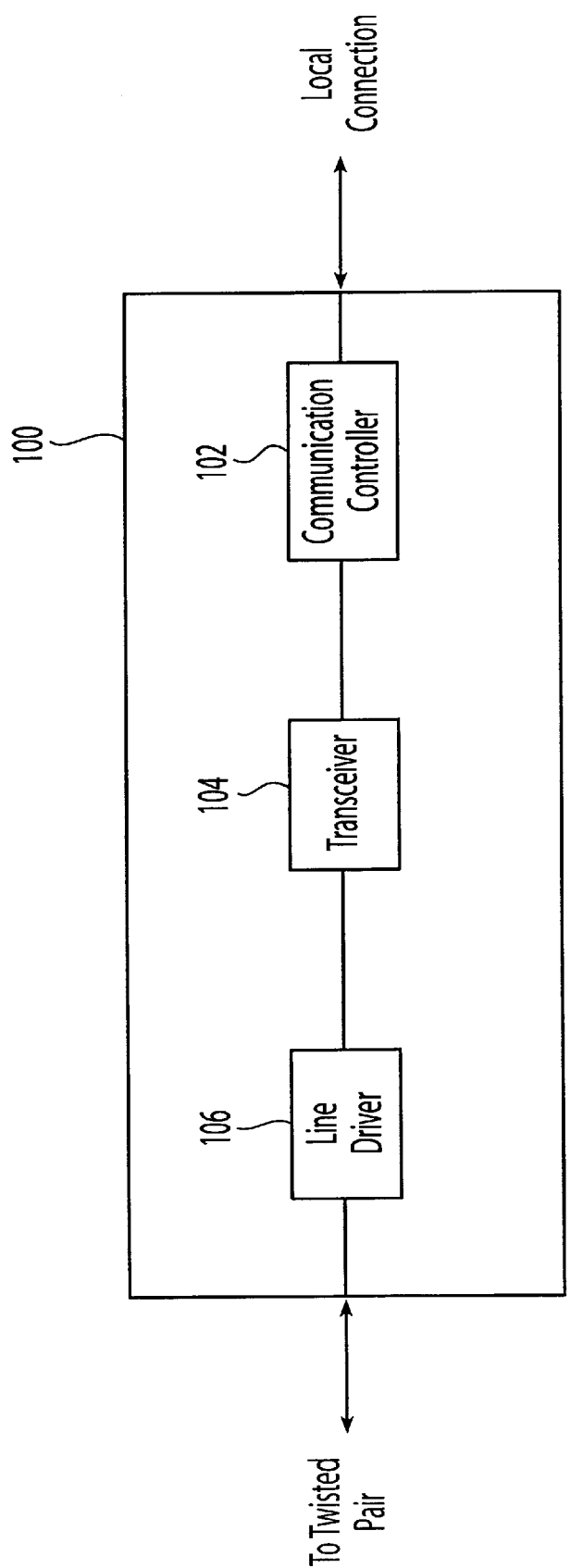
FIG. 1 presents a block diagram of a prior art xDSL modem.
Figure 2A:
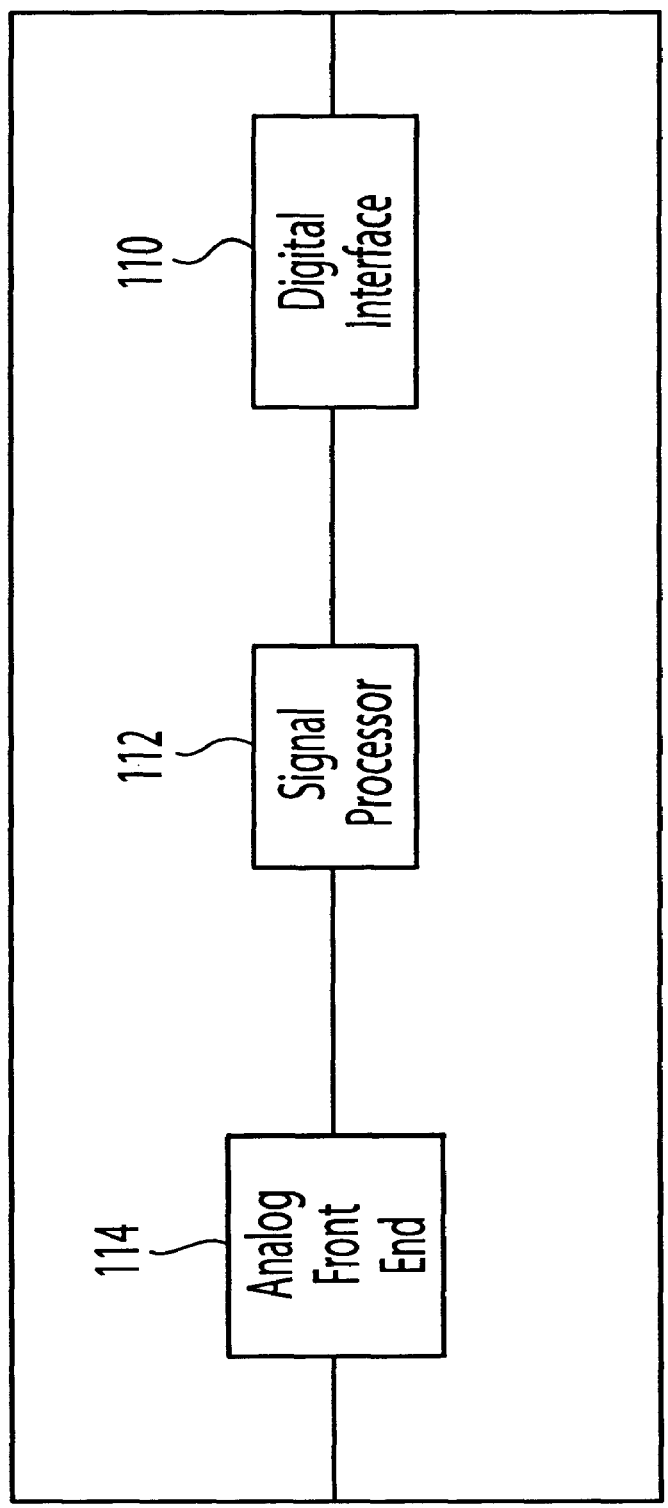
FIGS. 2a and 2b present a structural and a functional block diagram of a typical transceiver in the xDSL modem of FIG. 1.
Figure 2B:
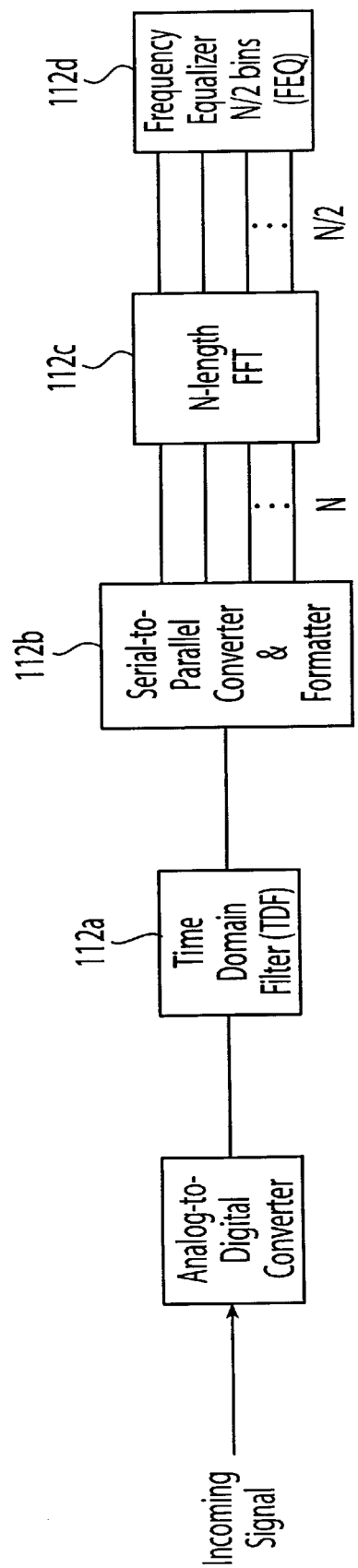
Figure 2C:
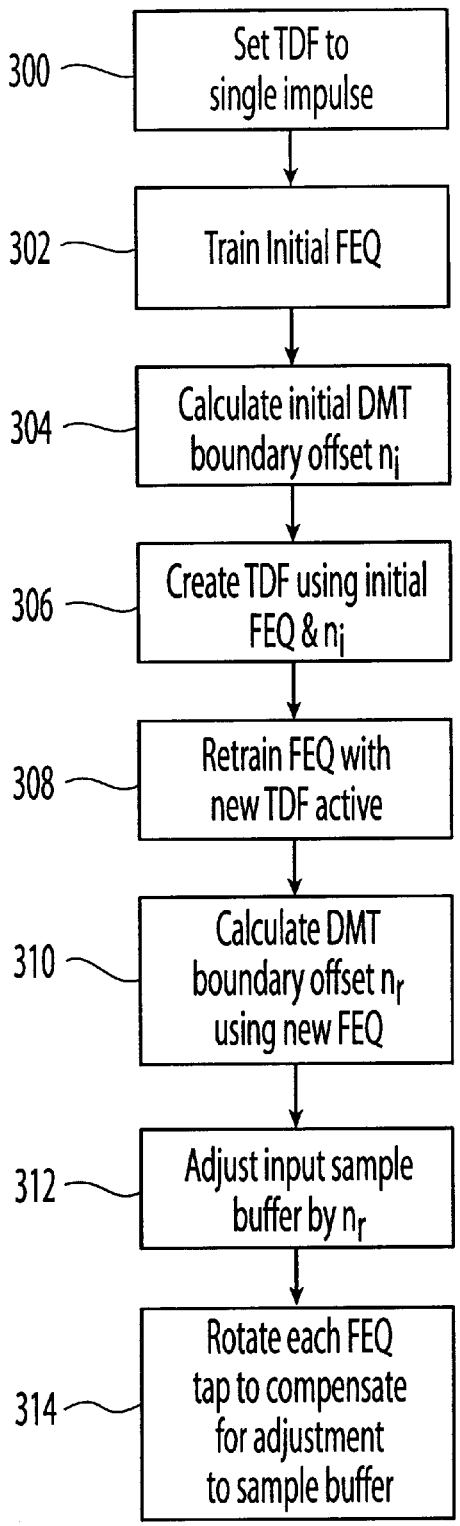
FIG. 2c presents a receiver training sequence in accordance with the present invention.

FIG. 2c illustrates the training sequence used in conjunction with the present invention. In step 300, the first TDF tap is set to 1 and the rest of the TDF vector is set to 0. Therefore, the TDF initially serves as an all-pass filter. In step 302, a first round of training is performed to determine the coefficients of an initial FEQ. This first round of training uses one of several established techniques, such as those disclosed in the above-identified references. At the conclusion of the first round of training, the FEQ is initially trained, but no ISI mitigation has been performed since the TDF is a single impulse and the symbol boundary has not been identified. In step 304, a first round of DMT symbol boundary detection is performed to determine a initial boundary offset ni based on the initial FEQ. In step 306, the initial FEQ is used to calculate the TDF to help mitigate ISI. Initial boundary offset ni can be used here to help center the peak of TDF, which now is no longer a single impulse. In step 308, a second round of training is conducted to determine a refined FEQ, again using standard techniques known in the art. For this second round of training, however, the calculated TDF, which is no longer a single impulse, is used to help mitigate ISI. Finally, in step 310, a second round of DMT symbol boundary detection is conducted to find a refined boundary offset nr, which may thereafter be used in DMT symbol boundary determinations. In step 312, the input sample buffer is adjusted by nr to align the FFT input vector boundary to a symbol boundary. Finally, in step 314, the FEQ taps are rotated (i.e., phase shifted) to compensate for the adjusted sample buffer.

Using the above-described manner, the resulting process compensates for any sample phase offset caused by the receiver's lack of synchronization with the transmitter symbol phase, as well as physical time delays such as system delay and transmission wire delay. When in place, the TDF counteracts ISI, while the FEQ counteracts attenuation and phase distortion due to the channel. In the training sequence of FIG. 2c described above, the taps of the FEQ may be calculated in a number of ways, such as aforementioned patent nos. U.S. Pat. No. 5,461,640 and U.S. Pat. No. 5,870,432, and so will not be discussed here in further detail. Established techniques may also be used to determine the symbol boundary offsets.

In the preferred embodiment, a cyclical sequence of DMT symbols is used to train the xDSL Modem. Once trained, the xDSL modem uses DMT signaling with a total of N1=N/2=128 discrete tones. In such case, the full length FEQ also has 128 complex taps. It should be kept in mind, however, that in the general case, depending on such factors as the channel's total bandwidth and the frequency separation of the tones, N may be some other number and this will consequently affect the number of tap coefficients for a full-length equalizer. Regardless of what technique is used or algorithm is used in its formation, a full-length FEQ, designated by W[k], k=0, 1, 2, . . . , N/2−1, is created in step 302 and also in step 308 of FIG. 2c.

Figure 3:
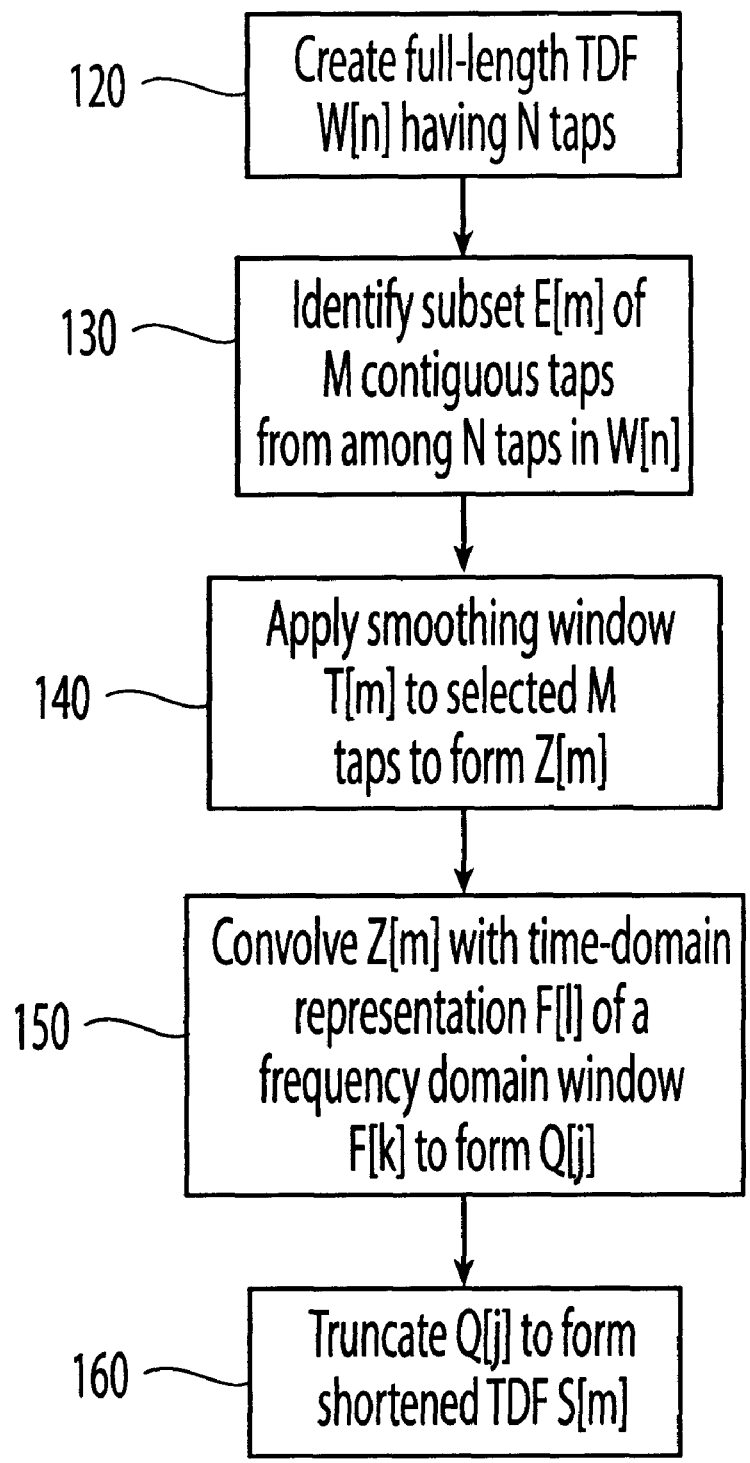
FIG. 3 presents a flow diagram of a method in accordance with the present invention.

FIG. 3 shows the flow of steps of one embodiment of the present invention to calculate a TDF. In step 120, the signal processor uses the full-length FEQ, W[k], to create a full-length TDF, designated w[n], n=0, 1, 2, . . . , N−1. This is done by creating an N-length vector comprising the complex coefficients of W[k] together with substantially all of the conjugates of W[k] to form a vector with Hermitian symmetry, and then applying an inverse DFT, preferably implemented as an IFFT, to obtain the full-length TDF w[n].

The real coefficients of w[n] are rolled around such that the taps are roughly centered about w[N/2−1]. In the method of the present invention, this full-length equalizer is to be reduced to a shortened equalizer comprising no more than M <N taps. Preferably, however, the ratio of N to M is on the order of 8 or even 16, so that given a full-length equalizer of 256 taps, the shortened equalizer only has 32 or 16 taps.

In step 130, a subset M of the original N taps in w[n] are selected based on a predetermined criterion. In the preferred embodiment, the predetermined criterion entails identifying the index c corresponding to the center of the jth order moment of w[n], and using the M contiguous taps centered about w[c] to form a truncated equalizer e[m], m=0,1, 2, ..., M−1, with e[m]=w[c−(M−1)/2+m] for M odd, and e[m]=w[c−(M/2)+1+m] for M even.

One way to identify the center c of the $j^{th}$ order moment of w[n] is to minimize the following over all c:

$$\min\left(\sum_{i=0}^{c} W[i]^j - \sum_{i=c+1}^{N-1} W[i]^j\right)$$

In the preferred embodiment, j=2 and so it is the center of maximum energy of the taps that is used as the metric. It must be noted, however, that one may also use other integer, and even non-integer values of j to identify the index c corresponding to the center of the jth moment of the tap coefficients.

A second predetermined criterion which may be used is to identify the index c corresponding to the center of M contiguous taps of w[n] having the maximum jth order density, and using only those taps in e[m]. In such case, c can be determined by maximizing the following over all c:

$$\max\left(\sum_{i=c-M/2+1}^{i=c+M/2} W[i]^j\right) \quad M \text{ even}$$

$$\max\left(\sum_{i=c-(M-1)/2)}^{i=c+(M-1)/2} W[i]^j\right) \quad M \text{ odd}$$

and e[m] is calculated as before. When this second predetermined criterion is used, j again is preferably 2 and so it is the contiguous energy density that is used as the relevant metric to determine c. Again, however, other values of j, including non-integer values, may be used for this metric.

As seen in step 140, regardless of how one arrives at the truncated equalizer e[m], the next step is to window e[m] with an M-length smoothing window t[m], m=0, 1, 2, ..., M−1 to form a windowed truncated equalizer z[m]. Preferably, z[m] is formed by a point-by-point multiplication of z[m] and t[m] such that z[m]=e[m]*t[m], m=0, 1, 2, ..., M−1.

Preferably, smoothing window t[m] contains coefficients conducive to minimizing frequency-domain sidelobes. Preferably, t[m] is a Hanning window, although Hamming, Bartlett, Blackman, Cosine and Gaussian windows, among others, may also be used for this purpose. It should be noted here, however, that z[m] may also be formed directly from w[n] by directly multiplying the appropriate coefficients of w[n] identified through the predetermined criterion by the proper corresponding values of the smoothing window t[m]. In the general case, t[m] would be permanently stored in a non-volatile memory associated with the signal processor of the xDSL modem, while w[n] would be calculated each time a communication link is established. If one wished, t[m] could be calculated each time, too.

As indicated in step 150, once the M-length, windowed, truncated equalizer z[m] is formed, it is subjected to additional filtering. The additional filtering is preferably carried out by convolving z[m] with a frequency-domain window F[k] which has been transformed into the time domain to f[l], l=0, 1, 2, ..., L−1. The result of this convolution is a filtered equalizer q[j] wherein q[j]=z[m] $\otimes$ f[l], j=0, 1, 2 ... M+L−2

Figure 4A:
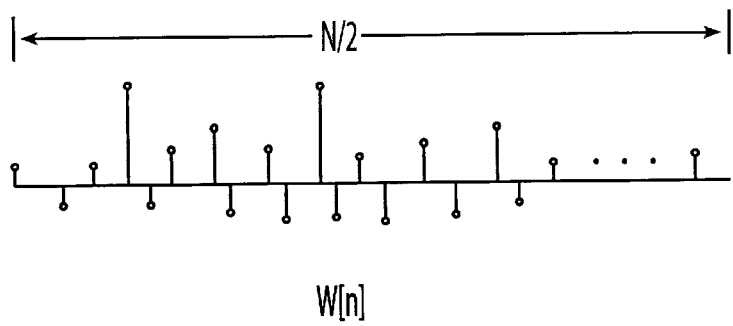
FIGS. 4A–4G present exemplary samples of vectors and filters used in the present invention.
Figure 4B:
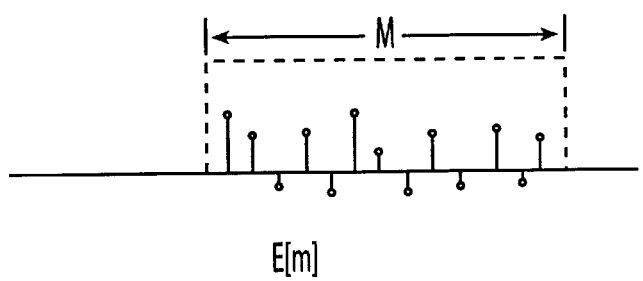
Figure 4C:
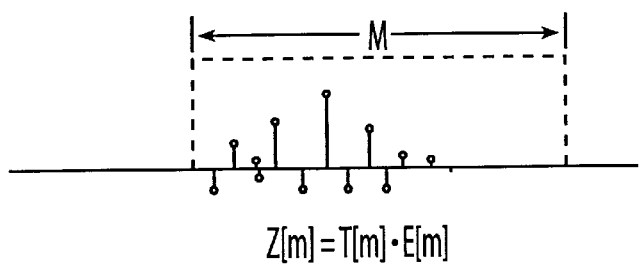
Figure 4D:
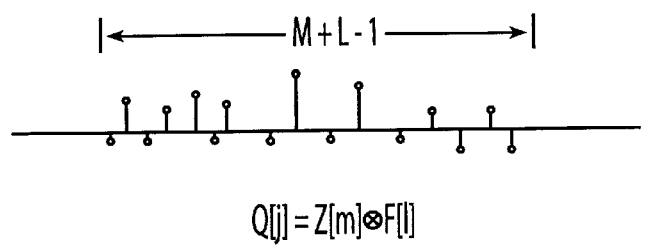
Figure 4E:
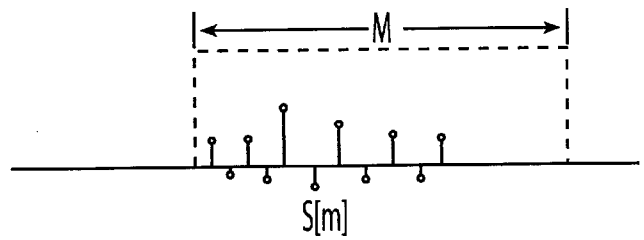
Figure 4F:
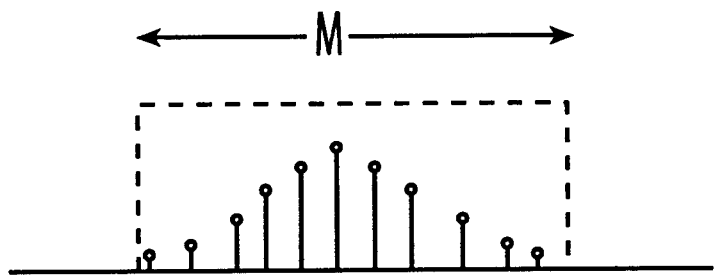
Figure 4G:
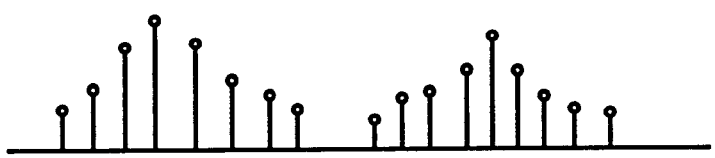

The shape of the frequency domain window F[k] is preferably another Hanning window having its endpoints at DC and Nyquist frequencies, as shown in FIG. 4G. Other window shapes may also be used to implement F[k], such as Hanning, Bartlett, Blackman, Cosine and Gaussian windows, among others. In the general case, the time domain version f[l] of the frequency domain window would also be stored in non-volatile memory, and used each time a communication link is established.

As indicated in step 160, Once the filtered equalizer q[j] has been calculated, the shortened equalizer s[m], m=0,1, 2, ... M−1 is created by using only M of the M+L−1 coefficients of q[j]. Preferably, s[m] utilizes the center most portion of q[j] as follows:

s[m]=q[L/2+m]; m=0, 1, 2, ... M−1.

It should be noted here that while L theoretically can take on any integer value no greater than M, L preferably is the same length as M.

The steps shown in FIG. 3 can be carried out entirely by programming the signal processor resident in an xDSL modem, or a processor associated with an xDSL modem. Therefore, the various vectors discussed above are principally just labels for data objects manipulated in software. These data objects may occupy distinct locations in physical memory. Alternatively, one or more of the vectors may share the same physical memory locations—for instance, e[m] is simply a subset of w[n], z[m] could simply replace e[m] point-by-point when the latter is multiplied by t[m], and s[m] is just a subset of q[m].

Though the preferred embodiment calls for a processor or computer resident in an xDSL modem to carry out the operations detailed above, it must be kept in mind that the same functionality may be implemented in a number of ways. For instance, the processor or computer may not reside in the modem, but only be connected thereto. Similarly, a co-processor, a vector processor, a DSP chip, or the like connected to the modem's signal processor may be employed to implement one or more of the steps of FIG. 3. Also, the executable software code may be in the form of microcode within the modem, rather than code which has been compiled and downloaded or burned onto PROMs, on-processor program memory, or other non-volatile memory.

In addition to the above, some, or all, of the steps shown in FIG. 3 may be implemented in special purpose hardware, and the hardware itself may take on different forms such as being implemented on a PC board, perhaps as a host-based or "soft" modem, or as a custom or semi-custom integrated circuit, such as an ASIC or gate array. In the case of a programmable DSP chip or a soft modem which allows a user to modify the executable software code resident therein, one may perhaps download appropriate software from the internet or other source. The downloaded software may be loaded into a flash RAM, or the like, associated with the xDSL modem.

Figure 5:
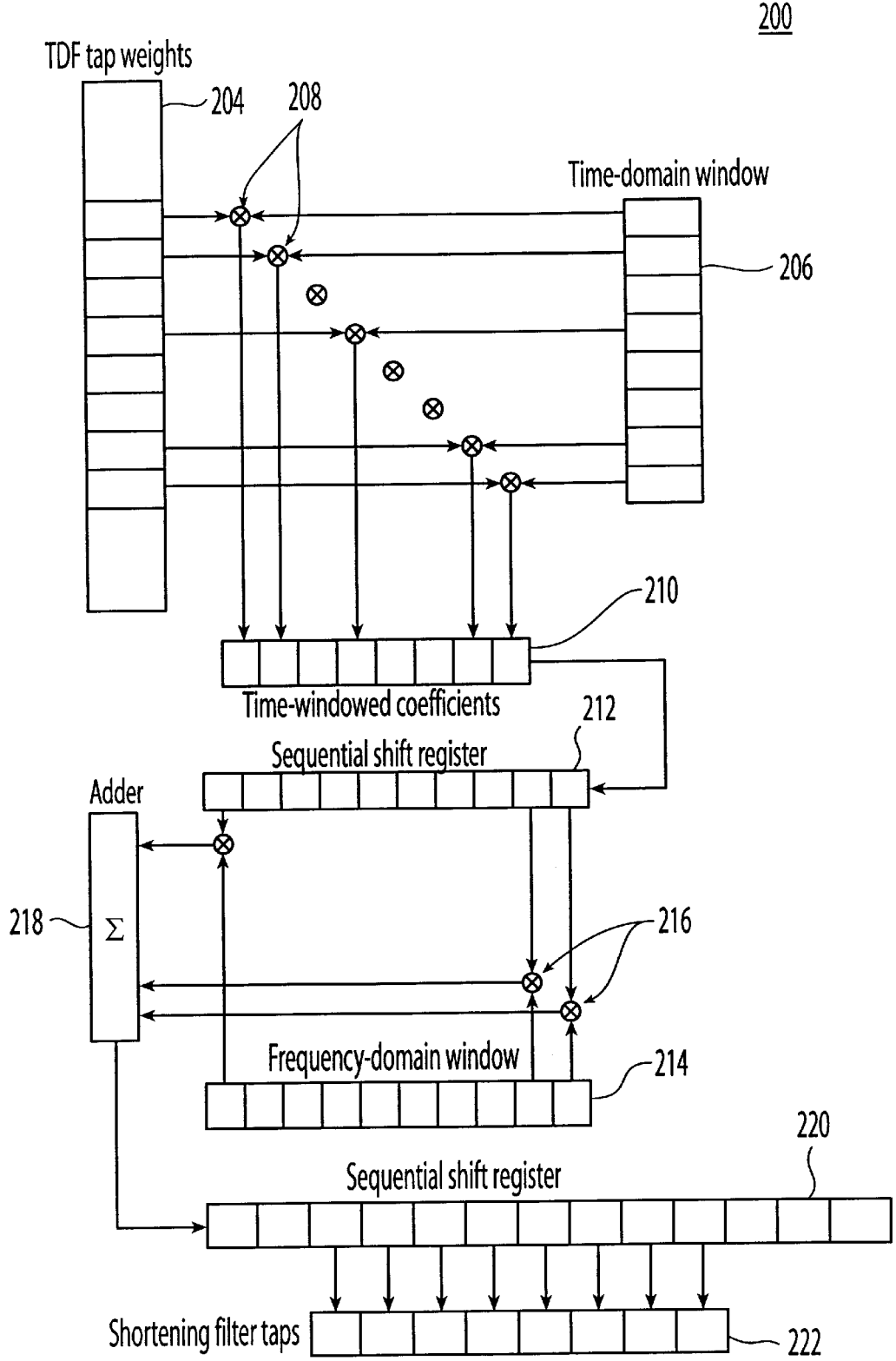
FIG. 5 shows a hardware diagram of an apparatus in accordance with the present invention.

FIG. 5 shows an idealized hardware implementation 200 in accordance with one embodiment of the present invention. The embodiment of FIG. 5 uses shift registers, multipliers, an L-input adder and memory. The full-length equalizer's N tap weights are stored in a first register or memory 204. Included among these are the M taps which will be selected by the predetermined selection criterion. The corresponding coefficients of the smoothing window are stored in a non-volatile second memory 206 of length M. Upon input from a control signal, the selected tap weights and corresponding window coefficients are input as multiplicands to a first collection of multipliers 208 to form the windowed truncated equalizer, which is stored in a buffer or third memory 210, also of length M. The contents of this third memory 210 are incrementally input to a first sequential shift register 212 of length L. Each time an additional coefficient of the windowed truncated equalizer from the third memory 210 is introduced to the sequential shift register 212, the contents of the entire sequential shift register 212 (with zero-values in the leading bins) and the time-domain representation f[l] of a frequency domain window, which is stored in a non-volatile third memory 214, are input to a second bank of multipliers 216. The second bank of multipliers 216 create partial products which are summed in an L-length adder 218 to form coefficients of the filtered equalizer q[j], each of which are shifted into a second sequential shift register 220 of length L+M-1. After the last coefficient of the windowed truncated equalizer has been shifted into the first sequential shift register 212 and all calculations have been completed, the second sequential shift register is filled with the complete coefficient vector of the filtered equalizer q[j]. At this point, the coefficients of the shortened equalizer s[m] can be brought into shortened equalizer memory 222 for use in channel equalization.

While the hardware diagram of FIG. 5 shows two banks of multipliers, it should be understood that this may also be accomplished with a single bank of multipliers, or even a small number of multipliers, depending on the type of control and logic circuitry provided. It is also understood that the various non-volatile memories may be ROMs, PROMS, EPROMs, EEPROMs or other types of memory which may or may not be physically separate from one another. These memories may be provided as a separate chip, a sub-circuit on a processor chip, or in any one of a number of different ways known to those skilled in the art. It is also understood that the various memories described above may be a part of a common RAM connected to the computing engine and partitioned by software into a plurality of vectors accessed by software, firmware or directly by hardware. Alternatively, some or all of the various memories may be distinct from one another, comprising special purpose registers or buffers. It should also be kept in mind that the hardware of FIG. 5 would also necessarily include control circuitry, oscillator signals, power supply lines and other well-known incidental features which are not shown.

Finally, while the above invention has been described with reference to certain preferred embodiments, it should be kept in mind that the scope of the present invention is not limited to these. One skilled in the art may find variations of these preferred embodiments which, nevertheless, fall within the spirit of the present invention, whose scope is defined by the claims set forth below.

What is claimed is:

1. A method of forming a shortened equalizer for an xDSL communication channel comprising:

calculating a full-length equalizer w[n], n=0, 1, 2, . . . N1-1, for said channel, said full-length equalizer having a predetermined number N1 of taps, wherein N1 is an even integer and n is an integer index of w[n];

determining a subset of M contiguous taps from among said N1 taps in accordance with a predetermined selection criterion to thereby form a truncated equalizer; wherein M is an integer smaller than N1, windowing said truncated equalizer with at least one time-domain window selected for its ability to reduce sidelobes in the frequency domain to thereby form a windowed truncated equalizer;

filtering the windowed truncated equalizer to thereby form a filtered equalizer; and selecting a subset M of taps from said filtered equalizer to thereby form a shortened equalizer.

2. The method of claim 1, wherein the step of filtering the windowed truncated equalizer includes the step of convolving the windowed truncated equalizer with a time-domain representation of a frequency domain window selected for its ability to reduce sidelobes in the time domain.

3. The method of claim 2, wherein the frequency domain window whose time-domain representation is convolved with the windowed truncated equalizer is a Hanning window.

4. The method of claim 1, wherein said step of determining a subset of M contiguous taps from among said N1 taps includes determining an index c corresponding to a center of a jth order moment of said full equalizer w[n] and using approximately M/2 contiguous taps on either side of said center.

5. The method of claim 4, wherein c is determined by minimizing:

$$\min\left(\sum_{i=0}^{c} W[i]^j - \sum_{i=c+1}^{N_1-1} W[i]^j\right).$$

6. The method of claim 1, wherein said step of determining a subset of M contiguous taps from among said N1 taps includes determining M contiguous taps of said full equalizer w[n] whose summed jth order values is a maximum.

7. The method of claim 6, wherein an index c of a center of said M contiguous taps within w[n] is determined by maximizing the following over all possible c:

$$\max\left(\sum_{i=c-M/2+1}^{i=c+M/2} W[i]^j\right) \quad M \text{ even}$$

$$\max\left(\sum_{i=c-(M-1)/2}^{i=c+(M-1)/2} W[i]^j\right) \quad M \text{ odd}.$$

8. An xDSL modem including a computer readable medium having executable software code stored thereon, the code for forming a channel equalizer, the code comprising:

code to calculate a full-length equalizer, said full-length equalizer having a predetermined number N1 of taps, wherein N1 is an even integer;

code for determining a subset of M contiguous taps from among said N1 taps in accordance with a predetermined selection criterion to thereby form a truncated equalizer, wherein M is an integer smaller than N1;

code for windowing said truncated equalizer with at least one time-domain window selected for its ability to reduce sidelobes in the frequency domain to thereby form a windowed truncated equalizer;

code for filtering the windowed truncated equalizer to thereby form a filtered equalizer; and code to select a subset of M taps from said filtered equalizer to thereby form a shortened equalizer.

9. The xDSL modem of claim 8, further comprising code to convolve the windowed truncated equalizer with a time-domain representation of a frequency domain window selected for its ability to reduce sidelobes in the time domain.

10. An xDSL modem including channel equalizer forming means, the channel equalizer forming means including:

means for calculating a full-length equalizer, said full-length equalizer having a predetermined number N1 of taps, wherein N1 is an even integer;

means for determining a subset of M contiguous taps from among said N1 taps in accordance with a predetermined selection criterion to thereby form a truncated equalizer, wherein M is an integer smaller than N1;

means for windowing said truncated equalizer with at least one time-domain window selected for its ability to reduce sidelobes in the frequency domain to thereby form a windowed truncated equalizer;

means for filtering the windowed truncated equalizer to thereby form a filtered equalizer; and means for selecting a subset of M taps from said filtered equalizer to thereby form a shortened equalizer.

11. The xDSL modem of claim 10 further comprising means for convolving the windowed truncated equalizer with a time-domain representation of a frequency domain window selected for its ability to reduce sidelobes in the time domain.

* * * * *